United States Patent [19]

Moffitt

[11] 3,960,636

[45] June 1, 1976

[54] METHOD AND APPARATUS FOR THE PRODUCTION OF SHEAR SEALS IN THERMOPLASTIC MATERIALS

[75] Inventor: Myron L. Moffitt, Fairport, N.Y.

[73] Assignee: Mobil Oil Corporation, New York, N.Y.

[22] Filed: June 19, 1974

[21] Appl. No.: 480,994

[52] U.S. Cl. .................................. 156/290; 53/39; 53/285; 100/226; 156/306; 156/306; 156/583; 264/248; 428/172
[51] Int. Cl.² ........................................ B32B 31/00
[58] Field of Search ............ 53/39, 285; 156/69, 156/290, 292, 306, 494, 574, 581, 583, 535, 582; 161/116; 264/248; 38/30, 63; 100/226; 428/156, 172

[56] References Cited
UNITED STATES PATENTS

| | | |
|---|---|---|
| 2,374,504 | 4/1945 | Salfisberg....................... 156/582 X |
| 3,078,201 | 2/1963 | Christie.............................. 161/146 |
| 3,405,502 | 10/1968 | Badder............................ 156/582 X |
| 3,673,041 | 6/1972 | Schulz et al. ...................... 156/306 |
| 3,783,156 | 1/1974 | Kuroda ................................ 264/94 |

Primary Examiner—William A. Powell
Assistant Examiner—Brian J. Leitten
Attorney, Agent, or Firm—Charles A. Huggett; James D. Tierney

[57] ABSTRACT

A method and apparatus for the production of improved heat seals in thermoplastic materials which includes causing displacement of thermoplastic material in the area being sealed during the sealing operation. The displaced thermoplastic serves to reinforce that area of the seal which is normally weakened as a result of the heat sealing step.

2 Claims, 6 Drawing Figures

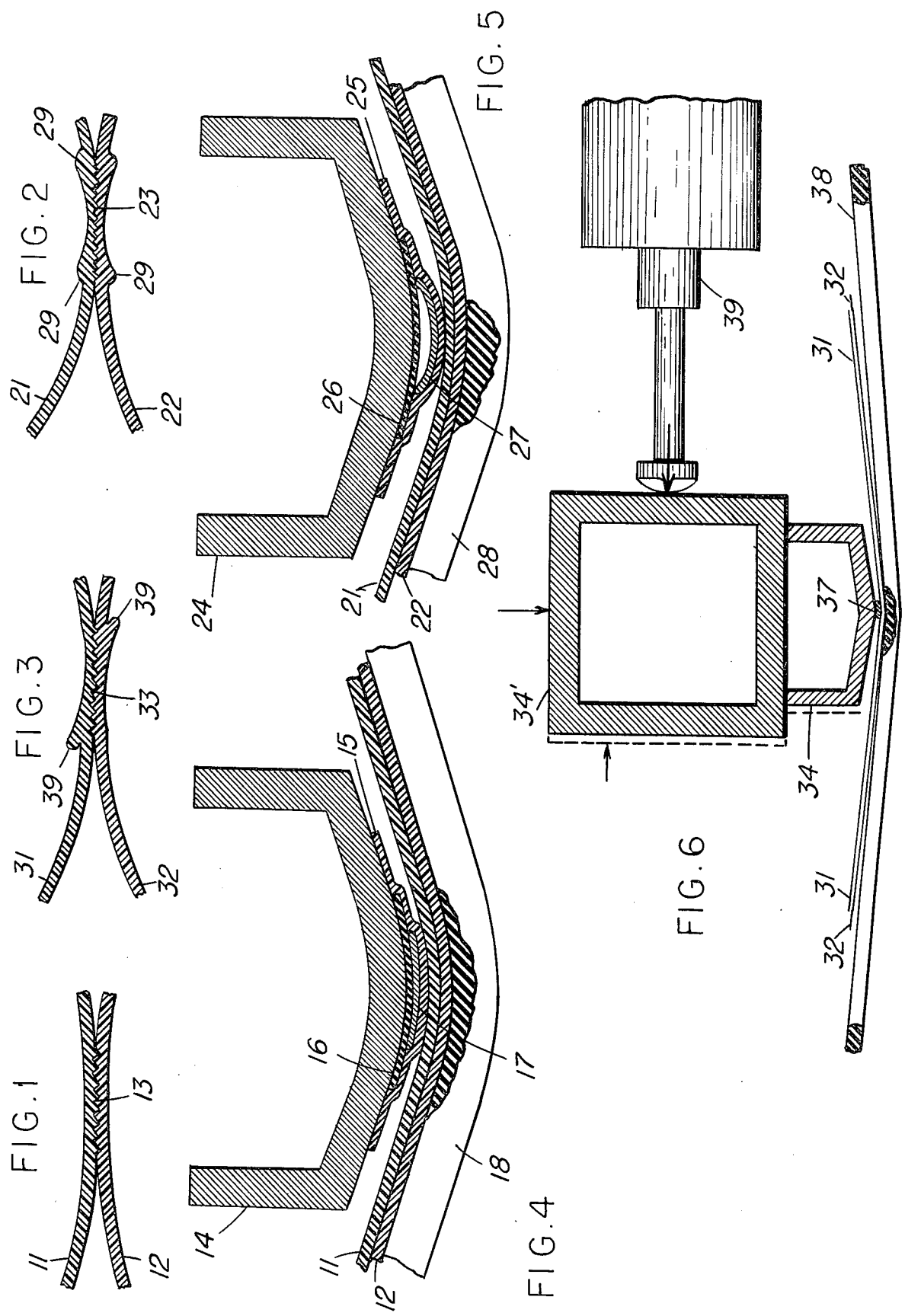

METHOD AND APPARATUS FOR THE PRODUCTION OF SHEAR SEALS IN THERMOPLASTIC MATERIALS

FIELD OF THE INVENTION

This invention relates to the apparatus and method of heat sealing materials, especially thermoplastic materials which are widely used in the packaging industry, for example. Thermoplastic films such as polyethylene, polypropylene, polyvinyl chloride, polystyrene, acrylic polymers, olefin copolymers, and other similar materials are used in the fabrication of many useful products including bags, clothing, coverings, overwrapped packages and many others. Sheets of such material are commonly joined by means of a thermal weld. The present invention provides an apparatus and method of improving such welds or seals by means of a shearing stress applied during the fabrication of the seal.

DESCRIPTION OF THE PRIOR ART

Generally, prior art processes for heat sealing thermoplastic film involves the clamping of film layers between two members, one or both of which are heated. The members then cooperate to exert heat and pressure to the layered series of film sheets so that fusion or melt bonding occurs between the layers. The heat and pressure causes the plastic layers to soften and, due to the applied pressure, fuse together to form the desired seal. In the past, the seal area has exhibited diminished structural properties as compared to the unsealed film adjacent the sealed area. The heating and melting of the film allows local relaxation of orientation properties imparted to the film during its manufacture and thereby causes undesirable changes in the physical properties (e.g. strength) of the film in the seal area.

Additionally, the fusion area in a seal band is not usually precisely defined but rather is abruptly discontinuous at the outer boundary of the melt zone so that stress concentrations are developed in this area when it is subjected to loading. This is a result of both geometric factors and the abrupt change in physical properties in the seal boundary area, i.e., that area where two or more unsealed layers intersect the seal area.

SUMMARY OF THE INVENTION

The present invention provides a method and apparatus for the production of thermal seals in thermoplastic layers of improved strength by means of a shearing stress applied to the material being sealed during the sealing operation. Multiple superposed layers of thermoplastic are supported on a resilient surfaced support adjacent a heat sealing element. The heat sealing element is brought into contact with the supported layers in that area where it is desired to heat seal the layers together. During sealing engagement of the heat seal element with the superposed layers, the sealing element displaces thermoplastic material which has become molten, by virtue of contact with the hot sealing element, away from the center of the seal area towards the outer boundaries of the seal. Upon cooling of the seal, the displaced thermoplastic in the seal boundary areas serves to physically strengthen the seal in that area which hitertofore had been the weakest area of the seal.

BRIEF DESCRIPTION OF THE DRAWINGS

FIG. 1 is a schematic section in section of a heat seal made according to the prior art.

FIG. 2 is a schematic section in section of a heat seal made according to this invention.

FIG. 3 is a schematic section in section of another form of heat seal made according to this invention.

FIG. 4 is a schematic view in section of a prior art form of heat sealing apparatus which may be employed to produce the seal as shown in FIG. 1.

FIG. 5 is a schematic view in section of a form of heat sealing apparatus in accordance with the present invention which may be employed to produce the seal as shown in FIG. 2.

FIG. 6 is a schematic view in section of another form of heat sealing apparatus in accordance with the present invention which may be employed to produce the seal as shown in FIG. 3.

DESCRIPTION OF SPECIFIC EMBODIMENTS

As hereinbefore disclosed, a particular purpose of the present invention is to produce heat seals in layers of thermoplastic material which are not characterized by susceptability to rupture and failure in that area of the seal intermittent the unsealed film layers and the seal boundary or edge. It has been found that when melted material from the central area of the seal is displaced to the longitudinal edges, the critical boundary areas aforediscussed, of the seal, seals are produced having strength and toughness properties approaching those of the base film with ultimate failure usually occuring in the film itself in an area remote from the seal area.

Displacement of molten thermoplastic from the central portion of the seal area during the sealing step may be accomplished by applying a downwardly directed vertical force to the central area of the seal while the layers are in a semi-molten or molten condition thereby forcing the thermoplastic to extrude or flow outwardly towards the longitudinal boundaries of the seal, and thereby reinforcing that area of the seal. Alternatively, semimolten or molten material may be displaced from the central portion of the seal during the sealing operation by longitudinally displacing the sealing element which results in displacement of melted or heat softened thermoplastic material toward the longitudinal boundaries of the seal.

A clearer understanding of the present invention may be had by reference to the accompanying drawings wherein FIG. 1 illustrates a prior art seal in cross-section, the seal having been made utilizing the conventional impulse sealer illustrated in FIG. 4. Seal bar mounting 14 has a strip of electrical insulating tape 16 adhered to its lower or sealing surface. An elongated heater wire or metallic ribbon 17 is secured to the surface of insulating tape 16 and opposite ends of wire 17 are secured to a source of electrical current (not shown). Wire 17 is usually protectively covered with a nonconducting material such as polytetrafluoroethylene tape 15, for example. In operation, multiple layers of thermoplastic 11 and 12 which are to be sealed together are placed on resilient support surface 18, in the present instance a silicone rubber belt, seal bar 14 (i.e., the lower or sealing surface thereof) is brought into pressure engagement with the uppermost film 11 and a pulse of current is passed through heater wire 17 heating it and the protective tape 15 (in contact with film 11) to the sealing temperature of the film layers. As hereinbefore discussed, this conventional impulse seal is characterized by having a non-uniform boundary area which results in seal failure in that area when stresses are applied to the sealed films.

FIG. 2 illustrates one form of seal which may be made in accord with the process of the present invention and FIG. 5 illustrates one form of an apparatus which may be employed to produce the seal configuration shown in FIG. 2. As shown in FIG. 5, seal bar 24 is provided on its sealing surface with electrical insulating tape 26 on which is mounted metallic heater ribbon 27. Ribbon 27 is contoured so that, in cross section, it has a radius of curvature as shown in FIG. 5. Protective insulator tape 25 covering ribbon 27 assumes a curved contour to conform to curved heater ribbon 27. When film layers 21 and 22, supported on resilient belt 28, are brought into contact with the sealing surface of seal bar 24, the contoured configuration of seal ribbon 27 and covering tape 25, during heat sealing operations, displaces molten thermoplastic outwards from the center of the seal area to the longitudinal boundaries of the seal area. The resultant seal has a cross section as shown in FIG. 2 with displaced material 29 reinforcing the seal boundary areas.

FIG. 3 illustrates a modified form of seal which may also be made in accordance with the process of the present invention and FIG. 6 illustrates one form of apparatus which may be employed to produce the seal configuration shown in FIG. 3. As shown in FIG. 6, seal bar 34 is provided with a length of metallic heat seal ribbon 37 secured to the sealing face of bar 34. Current, from a source not shown, is pulsed through ribbons 37 when it is heat activated for sealing. Film layers 31 and 32, to be sealed, are supported on resilient belt 38. As shown in phantom in FIG. 6, heat seal bar 34 is laterally displaced by shear cylinder 39 during the heat sealing operation. This causes a lateral displacement of sealing ribbon 37 which is in contact with the molten or heat softened seal area causing displacement of thermoplastic from the center of the seal area to the boundary of the seal area to produce a seal which, in cross section, is illustrated in FIG. 2.

In the following examples a number of improved heat seals were made on thermoplastic films in accordance with the method and apparatus of the present invention and compared to prior art heat seals.

EXAMPLE 1

Two low density polyethylene films, each having a thickness of 0.75 mil, were clamped together between a silicone rubber belt 28 and a seal bar 24 utilizing an impulse heat sealing apparatus of the type shown in FIG. 5. The two films were sealed together by passing a timed electrical pulse through heater wire 27 which subjected the films, in the sealing area, to a sealing temperature of 350°F. Since the heater wire 27 was curved (or crowned) as shown in FIG. 5, when sealing heat and pressure, i.e., about 20 p.s.i. was applied to the film layers melted thermoplastic was extruded toward the opposite edges of wire 27 to produce a seal having a cross-section as shown in FIG. 2.

The heat seals so made had a nominal width of 1/16 inch and were able to withstand a tensile stress of 1.93 pounds per linear inch applied in peel without either the films or the seal failing. The failure energy required for this seal was 0.219 foot pounds per square inch.

In contrast to this, heat seals were made in identical films, but using an apparatus of the type shown in FIG. 4 to produce heat seals of the type shown in FIG. 1. As shown in FIG. 4, the heat seal ribbon was substantially flat or gently curved in cross-section and did not have the pronounced radius of curvature as heat seal ribbon 27 shown in FIG. 5. Such heat seals failed at a tensile stress of 1.57 pounds per linear inch. The requisite failure energy for this seal was 0.072 foot pounds per square inch.

EXAMPLE II

Two low density polyethylene films, each having a thickness of 0.75 mil, were clamped together between a silicone rubber belt 38 and a seal bar 34 using an impulse heat sealing apparatus of the type shown in FIG. 6. The two films were sealed together by passing a timed electrical pulse through heat seal wire 37 which subjected the films, in the sealing area, to a sealing temperature of 300°F. Immediately after the heat pulse, and while the thermoplastic material in the seal area was still in a molten or heat softened condition, a shear force was applied to seal bar support 34 by pneumatically activated shear cylinder 39, displacing seal bar 34 and heat seal wire 37 by about 0.028 inch. The resultant shear force of wire 37 applied against the molten polyethylene in the seal area caused displacement of the polyethylene to the boundary of the seal area thereby forming a seal having a cross-section as shown in FIG. 3.

The heat seals so made had a nominal width of 1/16 inch and were able to withstand a tensile stress of 1.69 pounds per linear inch applied in peel without either the films or the seal failing. The failure energy required for this seal was 0.160 foot pounds per square inch.

It has been found that when seals are formed in accordance with the method described in Example II, excellent heat seal strengths are obtained within a displacement range of 0.017 to 0.034 inch. However, even minute lateral movement, however so slight, of the seal element will improve the seal. Conversely, in those applications where relatively thicker materials are being sealed, a seal element displacement greater than that defined above may be desirable.

Although for illustrative purposes, the sealing method of the present invention has been described in association with the employment of impulse heat sealing apparatus, it will be understood that other types of film sealing apparatus may be employed including constant heat sealers such as bar sealers.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. In a method for heat sealing together multiple superposed layers of thermoplastic material comprising bringing a heat sealing element into sealing engagement with said layers to effect sealing, the improvement which comprises laterally displacing a portion of said thermoplastic material in the heatseal area with said heat seal element while said element is in sealing engagement with said layers, said lateral displacement of material being achieved by lateral displacement of said sealing element.

2. Heat sealing apparatus comprising a resilient support surface, a heat sealing element adapted for sealing engagement in a seal area, multiple layers of thermoplastic supported on said support surface and displacement means to laterally displace molten portions of said layers in said seal area during sealing engagement of said sealing element, said displacement means comprising means to laterally displace said heat-seal element.

* * * * *